April 17, 1951     R. M. STRICKLAND     2,549,543
THREAD CUTTING TOOL WITH RETIRABLE CHASERS
Filed Sept. 28, 1946     3 Sheets-Sheet 1
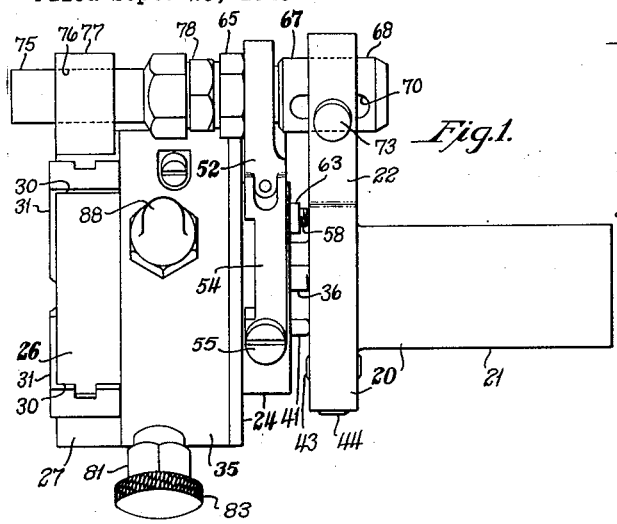
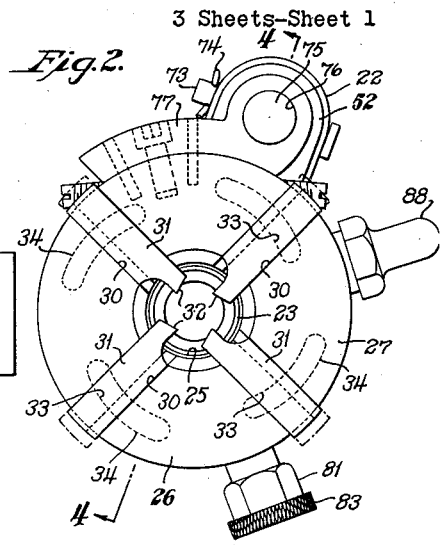
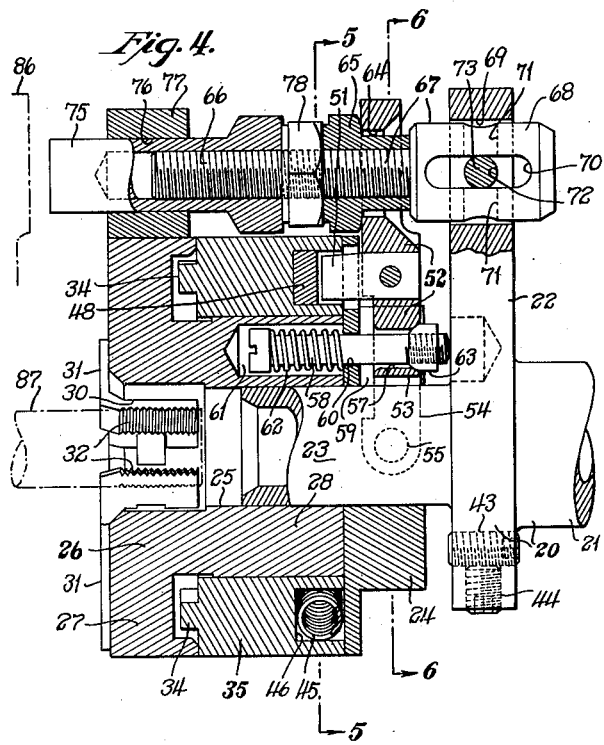
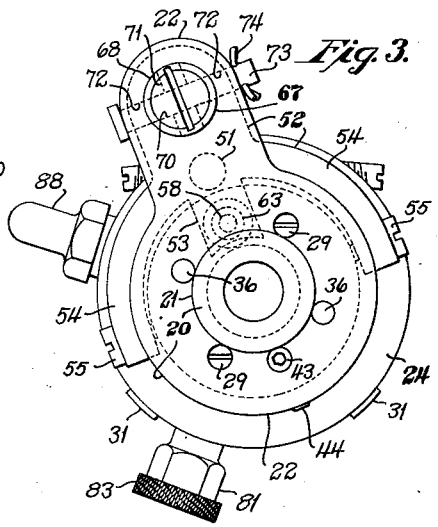
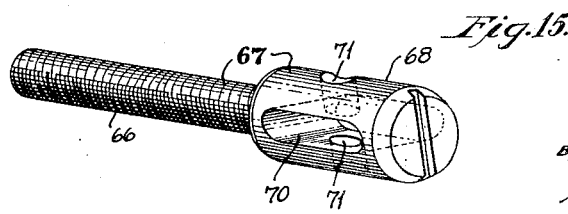
Inventor
Royce M. Strickland
By Seymour, Earle & Nichols
Attorneys April 17, 1951     R. M. STRICKLAND     2,549,543
THREAD CUTTING TOOL WITH RETIRABLE CHASERS
Filed Sept. 28, 1946     3 Sheets-Sheet 2
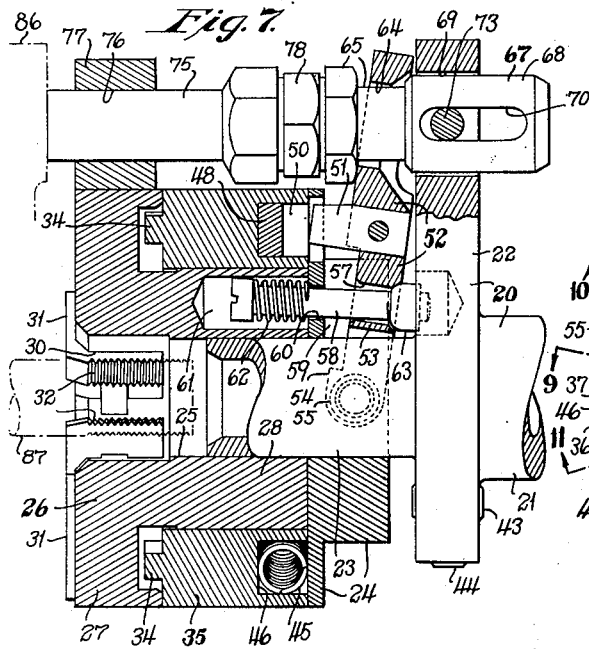
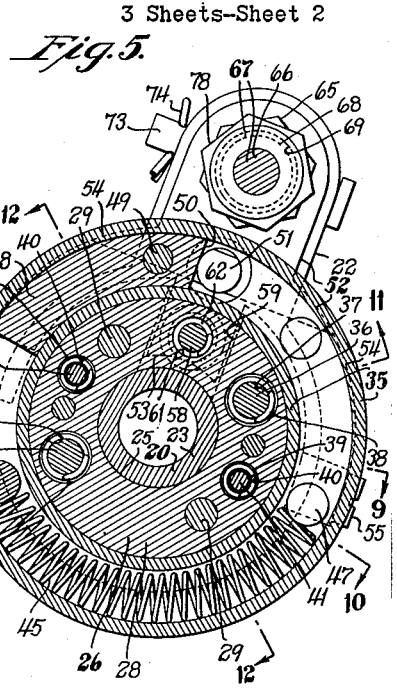
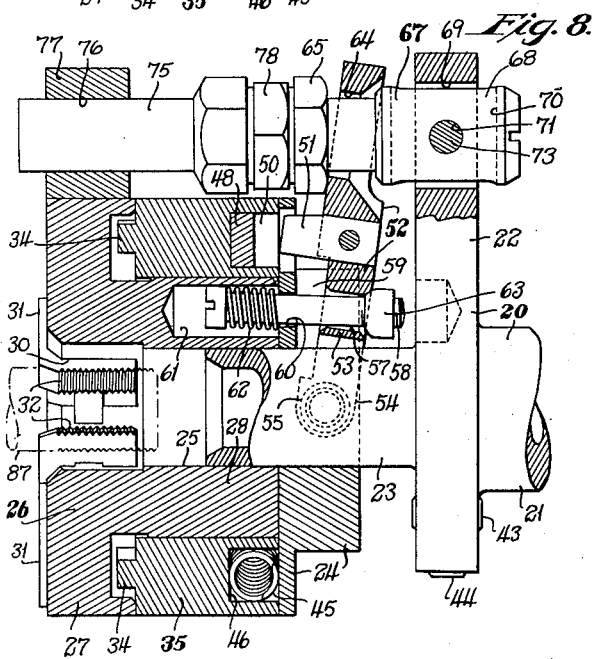
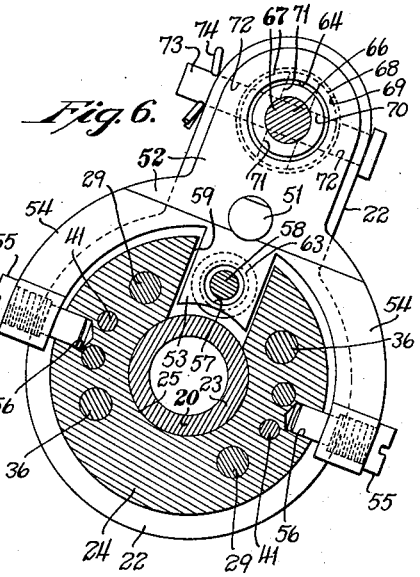
Inventor
Royce M. Strickland
By Seymour, Earle & Nichols
Attorneys April 17, 1951 R. M. STRICKLAND 2,549,543
THREAD CUTTING TOOL WITH RETIRABLE CHASERS
Filed Sept. 28, 1946 3 Sheets-Sheet 3
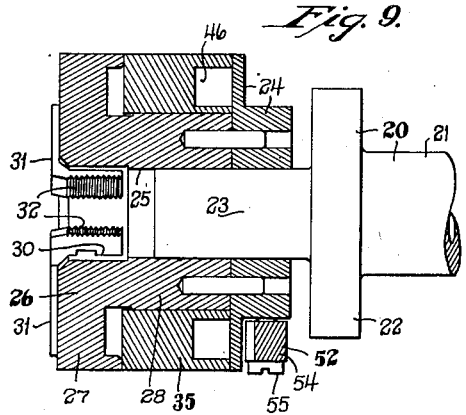
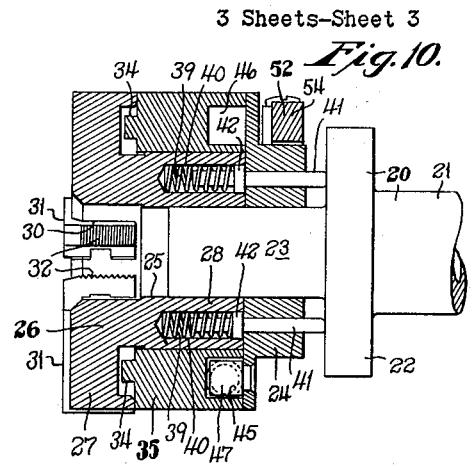
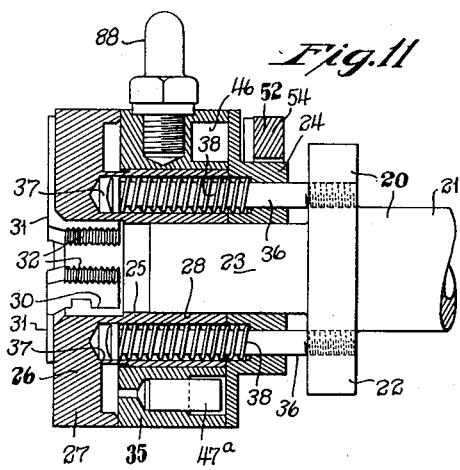
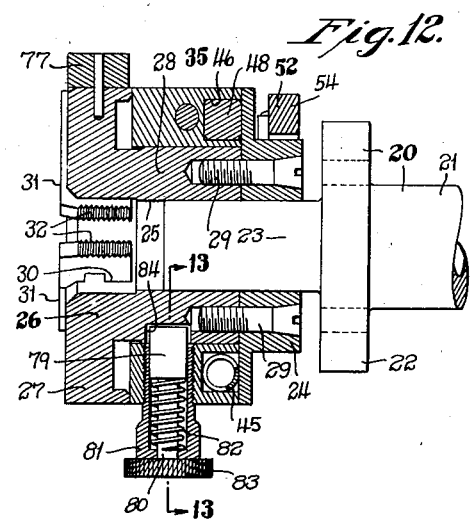
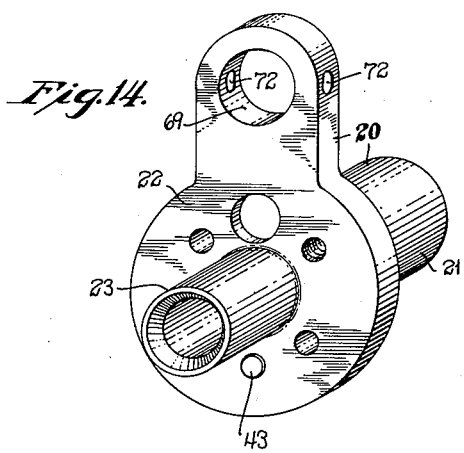
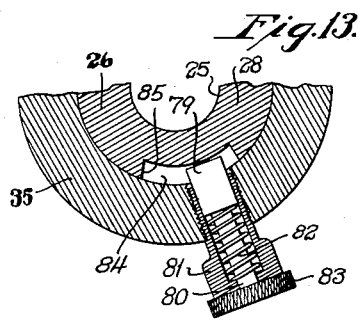
Inventor
Royce M. Strickland
by Seymour, Carle & Nichols
Attorneys Patented Apr. 17, 1951

2,549,543

UNITED STATES PATENT OFFICE 2,549,543

THREAD-CUTTING TOOL WITH RETIRABLE CHASERS

Royce M. Strickland, New Haven, Conn., assignor, by mesne assignments, to Greenfield Tap and Die Corporation, Greenfield, Mass., a corporation of Massachusetts Application September 28, 1946, Serial No. 700,120

5 Claims. (Cl. 10—96)

The present invention relates to improvements in thread-cutting tools and relates more particularly to improvements in thread-cutting tools with retirable chasers, i. e., thread-cutting tools in which the chasers may be automatically retired out of engagement with the work after the formation of a thread thereon, to thus enable the tool and work to be separated in an axial direction without requiring an unthreading operation.

Some types of threading tools of the character referred to are "tripped" by the engagement of a member thereof with an abutment during the forward axial travel of the tool with respect to the work. Other types of such tools are tripped by the newly-formed threads on the work acting to pull the chasers forwardly with respect to another portion of the tool. Other forms of thread-cutting tools have also been devised so as to be convertible from one mode of tripping to another such, for instance, as the threading-tool shown and described in Breitenstein Patent No. 2,197,336.

One of the objects of the present invention is to simplify the structure of the aforesaid Breitenstein patent to effect greater economy in manufacture and greater convenience in use.

Another object of the present invention is to provide a superior thread-cutting tool having retirable chasers, together with simple, reliable and effective means whereby the tool may be readily and conveniently converted to be tripped either by having a member thereof engaged with an abutment during the axial forward movement of the tool, or by having the chasers pulled bodily forwardly with respect to another portion of the tool.

A further object of the present invention is to provide a thread-cutting tool of the character just above referred to, which may be produced at a low cost for manufacture and at the same time produce accurate threads.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 1 is a view in side elevation of a self-opening die-head embodying the present invention and shown as set in readiness for a threading operation and in readiness to be tripped by an extraneous abutment;

Fig. 2 is a view thereof in front elevation;

Fig. 3 is a view of the die-head in rear elevation;

Fig. 4 is a central-longitudinal sectional view taken on the line 4—4 of Fig. 2 but on a larger scale;

Fig. 5 is a transverse sectional view taken on the line 5—5 of Fig. 4;

Fig. 6 is a similar view but taken on the line 6—6 of Fig. 4;

Fig. 7 is a view corresponding to Fig. 4 but illustrating the parts in the positions which they assume at the instant that the latching-pin reaches a position to permit chasers to be retired out of engagement with the work;

Fig. 8 is a central-longitudinal sectional view similar to Fig. 7, but showing the mechanism adjusted to effect the tripping of the die-head by the so-called "pull-off" action, and showing the parts in the positions which they assume at the instant the latch-member reaches a position to permit the chasers to be retired;

Fig. 9 is a broken view partly in elevation and partly in longitudinal section on the line 9—9 of Fig. 5;

Fig. 10 is a similar view but taken on the line 10—10 of Fig. 5;

Fig. 11 is a broken view partly in elevation and partly in longitudinal section taken on the line 11—11 of Fig. 5;

Fig. 12 is a similar view, but taken on the line 12—12 of Fig. 5;

Fig. 13 is a fragmentary sectional view taken on the line 13—13 of Fig. 12;

Fig. 14 is a perspective view of the mounting-member; and

Fig. 15 is a perspective view of the tripping-screw.

For the purpose of making clear a preferred embodiment of the present invention, there is shown in the accompanying drawings a self-opening die-head having many features in common with Breitenstein U. S. Patent No. 2,197,336 before referred to.

The self-opening die-head shown includes a mounting-member generally designated by the reference character 20 and including a rearwardly-extending tubular shank 21 and a plate-like body-member 22, from the front portion of which latter forwardly projects a tubular guide-portion 23. The elements 21, 22 and 23 may be formed integral or rendered unitary by welding or otherwise.

Both the shank 21 and the guide-portion 23 are circular in cross section and the said shank is adapted to be mounted in the turret or other appropriate feature of a screw-machine or the like. The guide-portion 23 projects forwardly through the apertured central portion of a retaining-plate 24 and into an axial passage 25 formed in a chaser-carrying member generally designated by the reference character 26.

The chaser-carrying member 26 above referred to includes a flange-like forward portion 27 from which rearwardly extends an integral tubular shank 28. Attached to the rear face of the said shank is the aforesaid retaining-plate 24 which is secured in place by means of screws 29—29, shown in Fig. 12 so as to, in effect, form part of the said chaser-carrying member. The said screws are visible in Fig. 3, due to holes in the body-portion 22 which register with the said screws and through which they may be removed and installed.

Mainly in its forward portion 27 and partly in its tubular shank 28, the chaser-carrying member 26 is formed with four (more or less) equidistantly-spaced and similar radial grooves 30 intersecting the axial passage 25, the outer periphery of the forward portion 27 and the rear face of the latter. Installed in each of the grooves 30 is one of four corresponding radially-movable chasers 31. Each of the said chasers is formed on its inner end with thread-cutting teeth 32 and each is formed in its rear face with a rearwardly - opening substantially - transverse but slightly-inclined notch 33.

The notch 33 in each of the chasers 31 is adapted to receive one of four similar cam-lugs 34, each of which is inclined with respect to the periphery of the chaser-carrying member 26. The cam-lugs 34 are formed integral with and project forwardly from the front face of an oscillating chaser-operating ring 35 turning upon the periphery of the tubular shank 28 of the chaser-carrying member 26. The said ring is confined against appreciable axial movement by the rear face of the front portion 27 of the said chaser-carrying member and the forward face of the retaining-plate 24.

As before pointed out, the retaining-plate 24 is rigidly organized with the chaser-carrying member 26 by means of the screws 29—29 (Fig. 12), so that the two said parts act as a unit and contain between them the chaser-operating ring 35 which has only oscillating movement relative thereto. For the double purpose of holding the chaser-carrying member 26 and the parts carried thereby against relative turning movement with respect to the mounting-member 20, two screw-studs 36—36 are threaded at their rear ends into the plate-like body-portion 22 of the body-member 20, as is shown in Fig. 11. Each of the screw-studs 36—36 extends with a smooth sliding fit through the adjacent portions of the retaining-plate 24 and also into one of two similar spring-receiving recesses 37—37 formed mainly in the shank 28 of the chaser-carrying member 26 but partly within the forward portion of the retaining-plate 24. Each of the said screw-studs 36—36 is encircled by one of two similar helical retracting-springs 38—38 respectively located in the spring-receiving recesses 37—37. Each of the retacting-springs 38—38 thrusts at its forward end against the under face of the head of the screw-stud 36 upon which it is mounted, and thrusts rearwardly against the rear end of the spring-receiving recess 37 in which it is located.

By the construction and arrangement of parts above described, the retracting-springs 38—38 act to yieldingly hold the mounting-member 20 and the parts carried thereby against forward movement relative to the mounting-member 20, all for purposes as will hereinafter appear.

For the purpose of maintaining the chaser-carrying member 26 and the parts carried thereby spaced forwardly of the body-portion 22 of the mounting-member 20 so as to provide a cushioning or buffer action, two helical cushioning-springs 39—39 are employed, as is especially well shown in Fig. 10 The said cushioning-springs are respectively housed in spring-pockets 40—40 formed in the rear portion of the tubular shank 28 of the chaser-carrying member 26. The spring-receiving pockets 40—40 are respectively located on diametrically-opposite sides of the chaser-carrying member 26 and each thereof receives the forward portion of one of two corresponding cushioning-plungers 41—41 each of which extends within the convolutions of the adjacent one of the two cushioning-springs 39—39.

Intermediate its respective opposite ends, each of the cushioning-plungers 41—41 above referred to is formed with an integral annular collar 42. Each of the said collars has a sliding fit within the adjacent one of the two spring-pockets 40—40 and has the rear end of the adjacent one of the cushioning-springs 39—39 thrusting rearwardly against it so as to normally hold the rear face of the given collar 42 in engagement with the forward face of the retaining-plate 24, as is indicated in Fig. 10. The rear portion of each of the cushioning-plungers 41—41 projects through and has a sliding fit in the retaining-plate 24 and is engaged at its rear end with the forward face of the body-portion 22 of the mounting-member 20.

The effective forward thrust of the cushioning-springs 39—39, though limited in extent by the engagement of the respective collars 42—42 with the retaining-plate 24, is greater than the rearward force exerted upon the chaser-carrying member 26 by the two retracting-springs 38—38 before referred to, so that, in the absence of an outside force, the chaser-carrying member 26, retaining-plate 24 and associated parts are held with respect to the body-portion 22 in the position indicated in Figs. 1, 4, 7 and 9 to 12 inclusive.

To provide for limiting or eliminating the cushioning action provided by the cushioning-springs 39—39 and asosciated parts, the body-portion 22 of the mounting-member 20 has threaded thereinto a stop-screw 43 extending in a direction parallel with the axis of the device and adapted to engage with the rear face of the retaining-plate 24. For the purpose of firmly holding the stop-screw 43 in any given position of adjustment, a binding-screw 44 is also threaded into the body-portion 22 but in a radial direction, to thus bind upon the periphery of the stop-screw 43, as is indicated in Fig. 4.

For the purpose of yieldingly urging the chaser-operating ring 35 to turn in a clockwise direction with respect to the chaser-carrying member 26 to effect the retirement of the chasers 31, a helical chaser-retracting spring 45 is employed. The said chaser-retracting spring is accommodated in a rearwardly-opening annular groove or recess 46 formed in the rear of the chaser-operating ring 35, as may be seen by reference to Figs. 4 and 5. The said chaser-retracting spring thrusts at one end against a stud 47 rigid with and projecting forwardly from the retaining-plate 24 into the annular groove or recess 46. The opposite end of the chaser-retracting spring 45 thrusts against a stud 47a rigidly mounted in the chaser-operating ring 35 and projecting rearwardly into the groove or recess 46 therein.

Mounted in the rearwardly-opening groove or recess of the chaser-operating ring 35 in a location of noninterference with the chaser-retracting spring 45, is a segmental latch-block 48 held in place against displacement in a circumferential direction by a pin 49. One end 50 of the latch-block 48 provides a latching-abutment which is adapted to be releasably engaged by one side of a latching-pin or -abutment 51.

The latching-pin 51 above referred to projects forwardly from and is rigidly mounted in the central portion of a latch-lever 52 immediately outwardly of a central tongue 53 forming an integral feature of the said lever. The said latch-lever 52 also includes two oppositely-curving arms 54—54 which together serve to embrace substantially half of the circumference of the reduced rear portion of the retaining-plate 24.

For the purpose of pivotally connecting the inner ends of the arms 54—54 of the latch-lever 52 to the retaining-plate 24, a pair of screw-studs 55—55 are employed. The said screw-studs are respectively threaded into the inner ends of the arms 54—54 in axial alignment with each other and have their reduced inner ends extended into outwardly-opening sockets 56—56 formed in the rear portion of the retaining-plate 24 at diametrically-opposite points, as is shown in Fig. 6.

The inwardly-projecting central tongue 53 of the latch-lever 52 is formed with a clearance-opening 57 through which extends a spring-plunger 58. The said spring-plunger 58 also extends through a clearance-notch 59 formed in the rear portion of the retaining-plate 24 and through a clearance-opening 60 formed in the forward portion of the said retaining-plate and communicating with the said latch-notch, as is apparent in Figs. 4, 7 and 8. The said clearance-notch 59 intersects both the inner and outer peripheries of the rear portion of the retaining-plate 24, as well as the rear face thereof, and serves to accommodate the central tongue 53 of the latch-lever 52.

The forward end of the spring-plunger 58 is formed with a head and extends into a rearwardly-opening pocket 61 formed in the tubular shank 28 of the chaser-carrying member 26. Encircling the inner portion of the spring-plunger 58 is a helical latch-spring 62 which thrusts at its rear against the forward face of the retaining-plate 24 and at its forward end against the rear face of the head of the said spring-plunger. Threaded onto the rear end of the spring-plunger 58 is a nut 63 having its forward portion rounded and bearing against the rear face of the tongue 53 of the latch-lever 52. The said latch-spring 62 thus exerts a constant but yielding effort to swing the outer end of the latch-lever 52 forwardly and hence serves to yieldingly maintain the forward end of the latching-pin 51 in engagement with the latching-abutment 50 of the latch-block 48.

The outer end of the latch-lever 52 is formed with a clearance-passage 64 to freely receive the tubular rear portion of a tripping-nut 65 which is threaded onto the stem 66 of a tripping-screw generally designated by the reference character 67. In addition to its externally-threaded stem 66, the tripping-screw 67 is provided at its rear end with a head 68. The said head is cylindrically contoured and is extended through and freely accommodated in a clearance-passage 69 extending from front to rear through the upper part of the body-portion 22 of the mounting-member 20, as is especially well-shown in Figs. 4, 7 and 8.

The head 68 of the tripping-screw 67 is formed with a diametrically-extending slot-like clearance-passage 70 extending diametrically and having its major dimension in the direction of the axis of the said head. The head 68 is also formed with a diametrical coupling-passage 71 extending perpendicularly with respect to and intersecting the clearance-passage 70.

The upper part of the body-portion 22 of the mounting-member 20 is formed with a passage 72 which diametrically intersects the clearance-passage 69 and is adapted to receive a coupling-pin or trip-selecting member 73. The said coupling-pin has a head at one end and is pierced adjacent its opposite end for the reception of a cotter-pin or the like 74 which serves as releasable retaining-means for the said coupling pin. The tripping-screw 67 may be rotated about its longitudinal axis so that the coupling-pin 73 may be extended either through its slot-like clearance-passage 70 or its coupling-passage 71.

Threaded onto the forward end of the stem 66 of the tripping-screw 67, is a tripping-head 75 which bears in a guide-opening 76 extending from front to rear through a bracket 77. The said bracket is rigidly attached to the outer periphery of the flange-like forward portion 27 of the chaser-carrying member 26.

The forward end of the tripping-head 75 normally projects forwardly of the front face of the chaser-carrying member 26 and may be adjusted as to the degree of its projection by rotating it on the stem 66 and then locked in place by tightly engaging a lock-nut 78 with its rear face. Said lock-nut is threaded onto the stem 66 in a location intermediate the tripping-nut 65 and the tripping-head 75.

As before explained, the chaser-operating ring 35 has oscillatory movement upon the chaser-carrying member 26 and for the purpose of releasably limiting such oscillating movement, a radially-retirable limiting-plunger 79 is employed. The said limiting-plunger is provided with a relatively-slender stem 80 and is mounted for reciprocating movement in a housing 81, as is especially well shown in Fig. 13. The said housing 81 has its inner end threaded into the chaser-operating ring 35 while its outer end projects beyond the outer periphery thereof. The limiting-plunger 79 is yieldingly urged inwardly by a helical spring 82 encircling the stem 80 and enclosed within the housing 81. The outer end of the stem 80 is provided with a knurled finger-piece 83 by means of which the said limiting-plunger may be drawn radially outwardly against the tension of the spring 82.

The inner end of the limiting-plunger 79 above referred to normally extends into an arcuate recess 84 formed in the outer periphery of the tubular shank 28 of the chaser-carrying member 26.

In a manner as will hereinafter appear, when the chaser-operating ring 35 is released to the action of the chaser-retracting spring 45, the inner portion of one side of the limiting-plunger 79 will be brought into engagement with the end wall 85 of the recess 84 to thereby check the further turning movement of the said ring 35.

The forward end of the tripping-head 75 is adapted to engage with a tripping-abutment indicated by the broken lines 86 in Figs. 4 and 7.

The structure shown is adapted to effect the threading of a work-piece such as is indicated by the broken lines 87 in Fig. 4, 7 and 8, all for purposes as will more fully hereinafter appear.

Operation

The self-opening die-head above described is adapted to have its chasers 31 released for outward retirement either by engagement effected between its tripping-head 75 and the tripping-abutment 86 or by relative axial forward draft exerted on the said chasers 31 by the work-piece 87. The operation will, therefore, be described in two phases.

The abutment-tripping of the die-head

With the parts positioned as shown in Figs. 1 to 4 inclusive, the die-head is ready for effecting the threading of a work-piece such as 87, since the chasers 31 are projected inwardly into their advanced or thread-cutting positions, and the latching-pin 51 by its engagement with the latching-abutment 50 is serving to rigidly but releasably hold the said chasers in the position referred to, against the tension of the chaser-retracting spring 45.

For convenience of description, it may be assumed that the shank 21 of the mounting-member 20 is firmly mounted in the turret of a screw machine or other suitable holder. It may further be assumed that the work-piece 87 is being rotated with respect to the die-head structure, which latter is held against rotary movement but with freedom for axial movement toward and away from the work-piece 87.

Under the conditions above referred to, the die-head may be moved axially into engagement with the work-piece 87 (or the said work-piece may be advanced axially toward the die-head), to effect the engagement of the chasers 31 with the said work-piece and thus thread the same.

Shortly before the work-piece 87 has been threaded to the desired extent, the forward face of the tripping-head 75 will engage with the tripping-abutment 86, whereupon the further forward movement of the said tripping-head and the parts rigid therewith (65, 67 and 78), together with the outer portion of the latch-lever 52, will be halted, while the remainder of the die-head structure will continue to move axially forwardly with respect to the work-piece 87.

Shortly after the start of the occurrence just above described, the latching-abutment 50 of the latch-block 48 will ride forwardly clear of the forward end of the latching-pin 51, so that the parts will assume the positions illustrated in Fig. 7 at the instant the said disengagement takes place. As soon as the parts have reached the positions in which they are shown in Fig. 7, the chaser-retracting spring 45 will assert itself and act to turn the chaser-operating ring 35 in a clockwise direction until the inner end of the stem 80 of the limiting-plunger 79 engages with the end wall 85 of the recess 84 in the chaser-carrying member 26.

By the movement last above described, the cam-lugs 34 of the chaser-operating ring 35 will have been moved in a clockwise direction and will, by virtue of their respective coupling with the notches 33 in the said chasers, effect the retraction or retirement of the chasers into the positions in which they are indicated by broken lines in Fig. 2.

The just-threaded work-piece 87, or its equivalent, and the die-head structure may now be axially separated, preparatory to another threading operation.

The die-head may be reset for a subsequent threading operation by turning the chaser-operating ring 35 in a counterclockwise direction against the tension of the chaser-retracting spring 45. This counterclockwise turning movement of the chaser-retracting spring may be effected by applying force to a resetting-lug 88 rigid with and radially projecting from the outer surface of the said chaser-operating ring 35.

As soon as the chaser-operating ring has been turned in a counterclockwise direction sufficiently to bring the latching-abutment 50 clear of the latching-pin 51, the latter will be moved forwardly into latching position by the forward swinging movement of the latch-lever 52 under the urge of the latch-spring 62.

The "pull-off" tripping of the die-head

When it is desired to effect the automatic tripping of the die-head by means of the work-piece 84 itself, the cotter-pin 74 may be removed from the coupling-pin 73 and the latter withdrawn from the passages 70 and 72 respectively in the head 68 of the tripping-screw 67 and the outer part of the body-portion 22. The entire unit comprising the tripping-nut 65, tripping-screw 67, tripping-head 75 and lock-nut 78 may now be turned substantially 90° about their longitudinal axes, to thus bring the coupling-passage 71 in the head 68 into position to receive the coupling-pin 73. The said coupling-pin may now be re-extended through the passage 72 in the outer part of the body-portion 22 and through the said coupling-passage 71 in the tripping-screw 67 whereupon the cotter-pin 74 may be restored to its place.

Under the conditions last above described, the tripping-screw 67 and the parts rigidly coupled thereto will no longer be able to have appreciable relative axial movement with respect to the mounting-member 20.

The die-head with its chasers in their inwardly-extended thread-cutting positions, may now be advanced axially toward a work-piece such as 87, and shortly before the desired length of thread has been completed the said advance may be halted. The continued rotary movement of the work-piece 87 will, however, draw forwardly upon the chasers and hence draw forwardly upon the unit which comprises in the main the chaser-carrying member 26, chaser-operating ring 35 and the retaining plate 24. Meanwhile, however, the tripping-screw 67 and the parts carried thereby will be held stationary by the coupling-pin 73. The upper portion of the latch-lever 52 will also be held stationary by its engagement wtih the tripping-nut 65, while its inner portion including its complemental arms 54—54, will be moved forwardly with the retaining-plate 24, to ultimately rock the said latch-lever into the position in which it is shown in Fig. 8.

The described rocking movement of the latch-lever 52 will ultimately disengage the latching-pin 51 from the latching-abutment 50 of the latch-block 48, the instant of which occurrence is indicated in Fig. 8. The described disengagement will permit the chaser-retracting spring 45 to assert itself and turn the chaser-operating ring 35 in a clockwise direction to effect the retraction of the chasers 31 and their disengagement from the work-piece 87. The retracting-springs 38—38 will now move the chaser-carrying member and associated parts bodily rearwardly until checked by the cushioning-springs 39—39.

The entire die-head structure may be now axially withdrawn away from the work-piece 87 and reset by turning its chaser-operating ring 35 in a counterclockwise direction preparatory to another threading operation.

*Resume*

From the foregoing it will be apparent that by releasing the coupling-pin 73 and then turning the unit comprising the tripping-nut 65, tripping-screw 67, tripping-head 75 and lock-nut 78 followed by the reinsertion of the said coupling-pin, the threading tool may be converted for being tripped by either of two modes.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. An automatic thread-cutting tool, including in combination: a mounting-member; a chaser-carrying member carried by and movable axially with respect to the said mounting-member; chasers carried by the said chaser-carrying member and movable with respect thereto into and out of position to engage with a work-piece; a chaser-operating member carried by the tool-structure and associated with the said chasers in operative relationship to advance and retire the same; spring-means yieldingly urging the said chaser-operating member in a direction to effect the retirement of the said chasers; a latch-member engageable with the said chaser-operating member to releasably hold the same against the urge of the said spring-means; a tripping-unit including a front member and a rear member threaded together and carried by the tool-structure on the exterior thereof with capacity for movement with respect to the said chaser-carrying member in a direction lengthwise of the tool-structure, the said tripping-unit projecting forwardly beyond the said chasers into position to be moved rearwardly relative to the said chaser-carrying member by the engagement of its front member with an extraneous tripping-abutment; a latch-lever pivotally connected to the said chaser-carrying member and to the rear member of the said tripping-unit to transmit the relative rearward movement of the said tripping-unit to the said latch-member to retire the latter; a shiftable trip-selecting member carried by the tool-structure and shiftable into and out of a coupling position engaging and coupling together the rear member of the said tripping-unit and the said mounting-member; and releasable retaining-means engaging with and releasably holding the said trip-selecting member in place.

2. An automatic thread-cutting tool, including in combination: a mounting-member; a chaser-carrying member carried by and movable axially with respect to the said mounting-member; chasers carried by the said chaser-carrying member and movable with respect thereto into and out of position to engage with a work-piece; a chaser-operating member carried by the said chaser-carrying member and movable axially therewith but oscillatable relatively transversely with respect thereto to advance and retire the said chasers; spring-means yieldingly urging the said chaser-operating member in a direction to effect the retirement of the said chasers; a latch-member engageable with the said chaser-operating member to releasably hold the same against the urge of the said spring-means and movable rearwardly relatively to the said chaser-operating and chaser-carrying members to release the said chaser-operating member; a tripping-unit carried by the tool-structure exteriorly thereof with capacity for reciprocation lengthwise thereof and in position for engagement with an extraneous abutment, the said tripping-unit having a rearwardly-facing abutment engageable with the said latch-member to cause the same to have relative rearward movement with respect to the said chaser-operating member and the said chaser-carrying member, the said tripping-unit also having a transverse coupling-passage of relatively-small extent in the direction of reciprocation of the said tripping-unit and a transverse clearance-passage of relatively-large extent in the said direction; and a coupling-member carried by the said mounting-member and selectively enterable into either coupling-passage or the clearance-passage of the said tripping-unit; the said coupling-member, coupling-passage and clearance-passage being constructed and arranged so that when the said coupling-member is entered into the said coupling-passage the said latch-member will be held by the rearwardly-facing abutment of the tripping-unit against effective forward movement when the said chaser-carrying member and the parts carried thereby are moved axially forwardly relative to the said mounting-member, and when the said coupling-member is entered into the said clearance-passage the said tripping-unit will be free to be moved rearwardly relative to the said chaser-carrying member and mounting-member to thereby cause the rearwardly-facing abutment to forcibly move the said latch-member rearwardly to release the said chaser-operating member.

3. An automatic thread-cutting tool, including in combination: a mounting-member; a chaser-carrying member carried by and movable axially with respect to the said mounting-member; chasers carried by the said chaser-carrying member and movable with respect thereto into and out of position to engage with a work-piece; a chaser-operating member carried by the said chaser-carrying member and movable axially therewith but oscillatable relatively transversely with respect thereto to advance and retire the said chasers; spring-means yieldingly urging the said chaser-operating member in a direction to effect the retirement of the said chasers; a latch-member engageable with the said chaser-operating member to releasably hold the same against the urge of the said spring-means and movable rearwardly relatively to the said chaser-operating and chaser-carrying members to release the said chaser-operating member; a tripping-unit carried by the tool-structure exteriorly thereof with capacity for reciprocation lengthwise thereof and in position for engagement with an extraneous abutment, the said tripping-unit including a front member and a rear member threadedly connected together and with the said rear member having a rearwardly-facing abutment engageable with the said latch-member to cause the same to have relative rearward movement with respect to the said chaser-operating member and the said chaser-carrying member, the said rear member of the tripping-unit also having a transverse coupling-passage of relatively-small extent in the direction of reciprocation of the said tripping-unit and a transverse clearance-passage of relatively-large extent in the said direction; and a coupling-member carried by the said mounting-member and selectively enterable into either coupling-passage or the clearance-passage of the said tripping-unit; the said coupling-member, coupling-passage and clearance-passage being constructed and arranged so that when the said coupling-member is entered into the said coupling-passage the said latch-member will be held by the rearwardly-facing abutment of the tripping-unit against effective forward movement when the said chaser-carrying member and the parts carried thereby are moved axially forwardly relative to the said mounting-member, and when the said coupling-member is entered into the said clearance-passage the said tripping-unit will be free to be moved rearwardly relative to the said chaser-carrying member and mounting-member to thereby cause the rearwardly-facing abutment to forcibly move the said latch-member rearwardly to release the said chaser-operating member.

4. An automatic thread-cutting tool, including in combination: a mounting-member; a chaser-carrying member carried by and movable axially with respect to the said mounting-member; chasers carried by the said chaser-carrying member and movable with respect thereto into and out of position to engage with a work-piece; a chaser-operating member carried by the said chaser-carrying member and movable axially therewith but oscillatable relatively transversely with respect thereto to advance and retire the said chasers; spring-means yieldingly urging the said chaser-operating member in a direction to effect the retirement of the said chasers; a latch-member engageable with the said chaser-operating member to releasably hold the same against the urge of the said spring-means and movable rearwardly relatively to the said chaser-operating and chaser-carrying members to release the said chaser-operating member; a tripping-unit carried by the tool-structure exteriorly thereof with capacity for both transverse turning and reciprocation lengthwise thereof and in position for engagement with an extraneous abutment, the said tripping-unit having a rearwardly-facing abutment engageable with the said latch-member to cause the same to have relative rearward movement with respect to the said chaser-operating member and the said chaser-carrying member, the said tripping-unit also having a transverse coupling-passage of relatively-small extent in the direction of reciprocation of the said tripping-unit and a transverse clearance-passage of relatively-large extent in the said direction and extending transversely at an angle with respect to the said coupling-passage; and a coupling-member carried by the said mounting-member and selectively enterable into either coupling-passage or the clearance-passage of the said tripping-unit; the said coupling-member, coupling-passage and clearance-passage being constructed and arranged so that when the said tripping-unit is turned into one position and the said coupling-member is entered into the said coupling-passage the said latch-member will be held by the rearwardly-facing abutment of the tripping-unit against effective forward movement when the said chaser-carrying member and the parts carried thereby are moved axially forwardly relative to the said mounting-member, and when the said tripping-unit is turned into another position and the coupling-member is entered into the said clearance-passage the said tripping-unit will be free to be moved rearwardly relative to the said chaser-carrying member and mounting-member to thereby cause the rearwardly-facing abutment to forcibly move the said latch-member rearwardly to release the said chaser-operating member.

5. An automatic thread-cutting tool, including in combination: a mounting-member; a chaser-carrying member carried by and movable axially with respect to the said mounting-member; chasers carried by the said chaser-carrying member and movable with respect thereto into and out of position to engage with a work-piece; a chaser-operating member carried by the said chaser-carrying member and movable axially therewith but oscillatable relatively transversely with respect thereto to advance and retire the said chasers; spring-means yieldingly urging the said chaser-operating member in a direction to effect the retirement of the said chasers; a latch-member engageable with the said chaser-operating member to releasably hold the same against the urge of the said spring-means and movable rearwardly relatively to the said chaser-operating and chaser-carrying members to release the said chaser-operating member; a tripping-unit carried by the tool-structure exteriorly thereof with capacity for reciprocation lengthwise thereof and in position for engagement with an extraneous abutment, the said tripping-unit including a front member and a rear member threadedly connected together and with the said rear member having a rearwardly-facing abutment engageable with the said latch-member to cause the same to have relative rearward movement with respect to the said chaser-operating member and the said chaser-carrying member, the said rear member of the tripping-unit also having a transverse coupling-passage of relatively-small extent in the direction of reciprocation of the said tripping-unit and a transverse clearance-passage of relatively-large extent in the said direction and extending transversely at an angle with respect to the said coupling-passage; and a coupling-member carried by the said mounting-member and selectively enterable into either coupling-passage or the clearance-passage of the said tripping-unit; the said coupling-member, coupling-passage and clearance-passage being constructed and arranged so that when the said tripping-unit is turned into one position and the said coupling-member is entered into the said coupling-passage the said latch-member will be held by the rearwardly-facing abutment of the tripping-unit against effective forward movement when the said chaser-carrying member and the parts carried thereby are moved axially forwardly relative to the said mounting-member, and when the said tripping-unit is turned into another position and the coupling-member is entered into the said clearance-passage the said tripping-unit will be free to be moved rearwardly relative to the said chaser-carrying member and mounting-member to thereby cause the rearwardly-facing abutment to forcibly move the said latch-member rearwardly to release the said chaser-operating member.

ROYCE M. STRICKLAND.

(References on following page)

REFERENCES CITED

The following references are of record in the file of this patent:

UNITED STATES PATENTS

| Number | Name | Date |
|---|---|---|
| 1,001,893 | Sampson | Aug. 29, 1911 |
| 1,154,568 | Harrington | Sept. 21, 1915 |
| 1,456,720 | Breitenstein #1 | May 29, 1923 |
| 1,888,067 | Breitenstein | Nov. 15, 1932 |
| 2,195,837 | Breitenstein #2 | Apr. 2, 1940 |
| 2,197,336 | Breitenstein | Apr. 16, 1940 |
| 2,291,920 | Reimschissel | Aug. 4, 1942 |